United States Patent [19]

Steckler

[11] Patent Number: 5,001,957
[45] Date of Patent: Mar. 26, 1991

[54] OFFSET BANDSAW

[76] Inventor: Edward T. Steckler, 124 Hershey Mill Rd., Apt. #A-1, Mountville, Pa. 17554

[21] Appl. No.: 279,664
[22] Filed: Dec. 5, 1988
[51] Int. Cl.$^5$ ............................................. B27B 13/10
[52] U.S. Cl. ...................................... 83/792; 83/661; 83/817; 83/820
[58] Field of Search ................. 83/807, 817, 820, 661, 83/792

[56] References Cited

U.S. PATENT DOCUMENTS

| | | | |
|---|---|---|---|
| 1,461,004 | 7/1923 | Napier | 83/661 |
| 1,916,903 | 7/1933 | Wine | 83/820 |
| 2,355,124 | 8/1944 | Testo | 83/661 |
| 3,390,598 | 7/1968 | Sands et al. | 83/820 |
| 3,474,693 | 10/1969 | Wilkie et al. | 83/820 |
| 3,518,909 | 7/1970 | Blue | 83/820 |
| 3,668,961 | 6/1972 | Blue | 83/820 |

Primary Examiner—Hien H. Phan
Attorney, Agent, or Firm—Buchanan Ingersoll; Michael L. Dever

[57] ABSTRACT

An offset bandsaw uses a drive pulley and a second pulley which is angularly offset from the first drive pulley. A bandsaw blade is formed by twisting the blade 360° before welding the two ends together to form a continuous belt. The combination of the offset rollers and the 360° twist permit the bandsaw blade to follow a more natural path which improves blade life. Rollers may be provided intermediate the drive pulley and top pulley to position the bandsaw blade portions in the same plane. Alternatively one may provide a third or fourth pulley to create a precision saw which can cut tight radii in a workpiece and make sizeable square cuts through stock of any length.

8 Claims, 2 Drawing Sheets

OFFSET BANDSAW

BACKGROUND OF THE INVENTION

1. Field of the Invention

This invention relates to the field of bandsaws and more particularly to a bandsaw having offset pulleys.

2. Description of the Prior Art

Bandsaws have been used for a variety of applications from cutting wood to slicing bread. These bandsaws typically employ two pulleys or wheels around which a belt forming the bandsaw blade travels. At least one of the pulleys is connected to a drive means which provides rotation to the pulley. As the pulley rotates, the bandsaw blade is carried along, thereby providing sufficient speed to the bandsaw blade to allow it to perform its cutting operation.

Typically, the bandsaws are of two types. In the first type of bandsaw, such as seen in bread slicers, the rotational planes of each of the pulleys are parallel and the pulleys have generally the same diameter. The bandsaw blade is wrapped around each pulley in such a manner as to provide two parallel cutting blade portions. The blade portions cut in separate kerfs and cut in opposing directions.

The second type of bandsaw employs parallel pulleys but operates the bandsaw blade in a figure 8 pattern. The bandsaw blade is twisted so that the cutting edge of the bandsaw blade is pointed in opposite directions on each of the pulleys. In such an arrangement, the bandsaw blade forms a figure 8 pattern. At the center point of the figure 8, where the opposing portions of the bandsaw blade intersect, the cutting edge of each portion of the bandsaw blade faces the same general direction. Moreover, each portion of the bandsaw blade cuts in the same kerf. In this manner, dual opposing cuts are made in the same kerf, thereby providing a more productive saw.

Each of these bandsaw designs are beset by problems which hinder their operability. In the first arrangement, if only a single cut is desired, the pulleys must be sufficiently large so that the second cutting blade portion will not interfere with the workpiece. As a result, only one portion of the bandsaw blade will be used in the cutting process. This creates an inefficiency which slows down production. The problems with the second design include the wear on the bandsaw blade as it follows an unnatural figure 8 path. The blade must be constantly adjusted to provide proper tracking of the belt around the pulleys. In addition, stresses build up on the bandsaw blade as a result of the forced twist, thereby causing early deterioration and failure of the blade. Moreover, because the opposing portions of the bandsaw blade do not cut in the same plane or closely parallel to one another, such a bandsaw is unable to handle intricate cutting operations such as those needed to cut a radius in the workpiece. Consequently, there is a need for a bandsaw in which two blade portions cut in a single kerf. Moreover, there is a need for a bandsaw which provides a more natural dual cutting action which will not cause premature failure of the blade.

SUMMARY OF THE INVENTION

I provide a bandsaw blade having a 360° twist provided therein. Bandsaw blades are generally formed by welding the ends of a strip of belt together. Before welding, I twist the belt 360° thereby providing a natural twist in the blade itself. I have found that this inherent twist when combined with other enhancements of my invention eliminates the stresses ordinarily associated with a forced-twist bandsaw blade and eliminates the need to constantly align the belt on the pulleys.

In order to accommodate the twist in the bandsaw blade, I permit one of the pulleys to be adjusted to an offset position relative to the other pulley. The angle of the offset required depends on the distance between the two pulleys. The closer together the two pulleys, the greater the offset angle needs to be to provide a natural and steady path for the bandsaw blade.

The offset of the pulleys combines with the 360° twist of the blade to provide a bandsaw wherein the twisting forces on the blade are minimized. The path on the bandsaw blade between the pulleys forms a natural figure 8 pattern. The blade portions intersect along the cutting plane, thereby providing a downward cut and possibly an upward cut to the workpiece. The downward moving blade portion and the upward moving blade portion can be within the same kerf on the workpiece or slightly offset from one another. However, because the blades are in the same plane, the bandsaw cannot be used to cut intricate shapes when wide blades are mounted on it.

In order to cut intricate shapes only one moving blade portion is used. The second portion may be threaded over a third pulley to divert it from the cutting table.

I prefer to provide two sets of upper and lower roller pairs positioned intermediate the drive pulley and offset pulley. Each set of upper and lower roller pairs aligns a portion of the cutting portion of the bandsaw blade near the cutting table.

DESCRIPTION OF THE PREFERRED EMBODIMENTS

Figure 1:
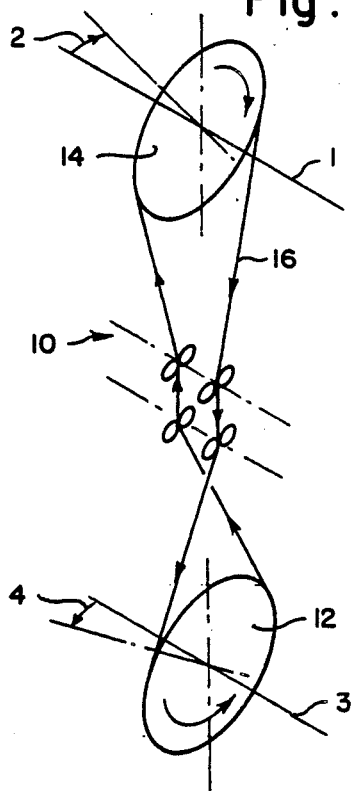
FIG. 1 is a diagrammatic view of a present preferred offset bandsaw according to my invention.
Figure 2:
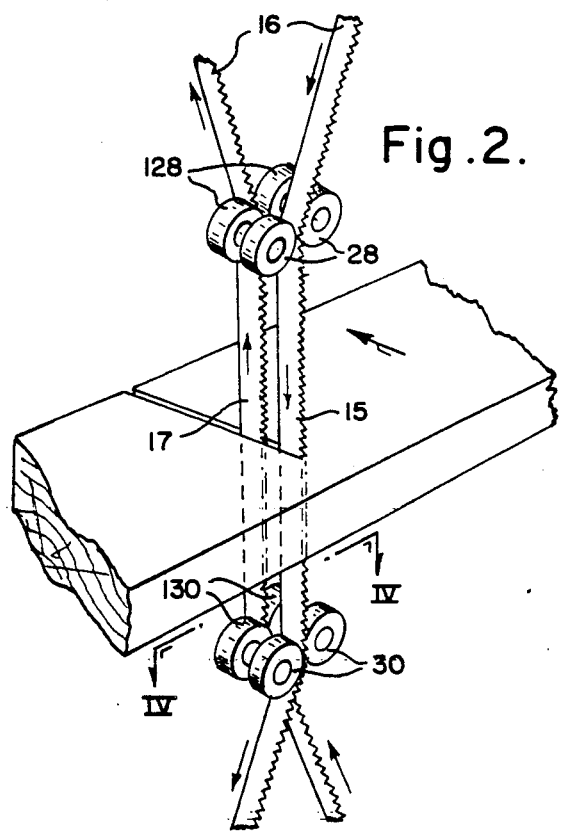
FIG. 2 is an isometric view showing the cutting zone in the preferred offset bandsaw of FIG. 1.
Figure 3:
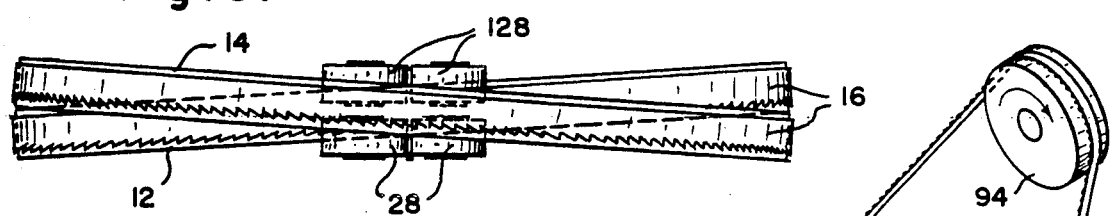
FIG. 3 is a top plan view of the bandsaw of FIG. 1.
Figure 4:
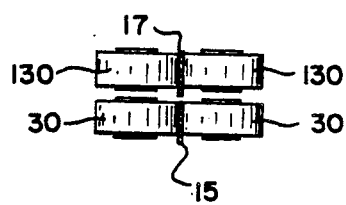
FIG. 4 is a sectional view taken along the line IV—IV of FIG. 2.

As shown in FIGS. 1, 2 and 3 the offset bandsaw 10 uses drive pulley 12 and top pulley 14 to hold bandsaw blade 16 in a tight engagement. I prefer to make drive pulley 12 and top pulley 14 the same size although they can have different diameters. A rubber tire preferably is mounted on drive pulley 12 and top pulley 14 to prevent blade 16 from slipping and the teeth on blade 16 from dulling. Bandsaw blade 16 is twisted 360° before it is welded together to form an endless belt. Top pulley 14 is angularly offset from drive pulley 12 as shown in FIG. 3. The amount of offset from a vertical plane indicated by lines 1 and 3 is shown by arrows 2 and 4 which run from the plane to a centerline of rotation of the pulleys. The combination of this offset and the 360° twist in belt saw blade 16 causes the path of bandsaw blade 16 to form a natural figure 8 pattern. Consequently, the blade will not break as easily as a blade which does not have a 360° twist.

Drive pulley 12 and top pulley 14 rotate in opposite angular directions. This causes bandsaw blade 16 to follow a pattern which forms downward cutting portion 15 and upward cutting portion 17. Downward portion 15 and upward portion 17 intersect on a desired cutting plane, thereby avoiding the need for a blade return arm. A floor support and a ceiling support, not shown, may be used to support the pulley 12 and 14. The cutting portions 15 and 17 can be slightly offset to provide a downward cut and an upward cut to the workpiece. In order to provide maximum working space, supporting arm (not shown) of top pulley 14 is preferably a U-shaped member adapted to permit the workpiece to travel within the channel of the supporting arm. Alternatively, a ceiling support, not shown, may be used to support the offset pulley 14.

I provide a floor model bandsaw in which top pulley 14 is not positioned plumb above drive pulley 12. Such a model enables sizeable square cuts to be made on a workpiece of any length. In this design, the blade 16 passes squarely through the level work table. The angle between the rotational plane of the offset pulley 14 and the rotational plane of the drive pulley 12 is dependent on the diameter of the pulleys and the distance between them. The nearer the pulleys, the greater the offset angle needed to provide a natural path for the bandsaw blade 16. I have found that for wheels 20 inches in diameter, an offset angle of approximately 40° is preferred. Slight adjustments may be necessary to account for the width of blade 16, the style of cutting teeth and normal stretching or shortening of blade 16 due to rewelding.

As shown in FIG. 2 the downward portion 15 and upward portion 16 of the blade pass through rollers positioned near the table. A front set of upper roller pairs 28, a front set of lower roller pairs 30, a back set of upper roller pairs 128 and a back set of lower roller pairs 130 are provided intermediate drive pulley 12 and top pulley 14. The upper rollers and the table (not shown) define the cutting zone 32. Each set of upper roller pairs 28 and 128 and lower roller pairs 30 and 130 rotate independent of the other.

In operation, downward cutting portion 15 of bandsaw blade 16 encounters the front set of upper and lower roller pairs 28 and 30. The roller pairs 28 and 30 position downward cutting portion 15 along a desired cutting line. Upward cutting portion 17 of bandsaw blade 16 is positioned along the same cutting line by the back set of roller pairs 128 and 130. In this manner, downward cutting portion 15 and upward cutting portion 17 can be maintained in the same kerf. One may provide lateral adjustment means (not shown) to permit the back rollers to be moved relative to the front rollers thereby allowing both the downward portion of the blade and the upward portion of the blade to cut the workpiece.

Figure 5:
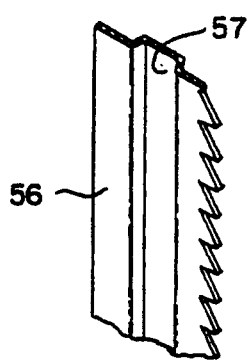
FIG. 5 is a perspective view of a portion of an alternate bandsaw blade for use with the offset bandsaw of FIG. 2.
Figure 6:
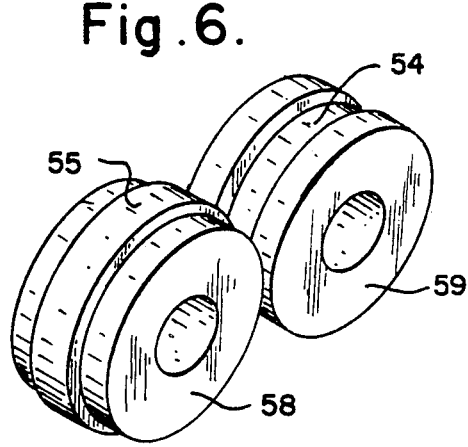
FIG. 6 is an isometric view of the rollers used with the bandsaw blade of FIG. 5.
Figure 7:
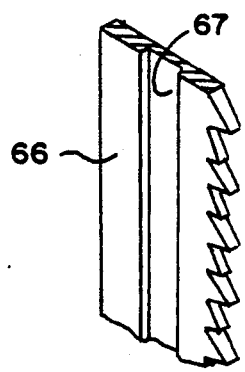
FIG. 7 is a perspective view of a portion of another bandsaw blade for use with the offset bandsaw of FIG. 2.

In order to better secure the bandsaw blade between roller pairs, a modified bandsaw blade can be used. As shown in FIGS. 5 and 6, rolled groove 57 is provided down the center of bandsaw blade 56 and is designed to coact with roller pairs 58 and 59 specifically adapted to receive groove 57. A groove 54 is provided along the outside surface of one of the rollers 59 and a corresponding rib 55 is provided on roller 59. Groove 57 on blade 56 fits between rib 55 and groove 54 to maintain bandsaw blade 56 in a position between rollers 58 and 59. Blade 56 must be formed of a higher quality of steel than ordinary bandsaw blades in order to apply rolled groove 57 thereto. Otherwise, one may also provide a cut grooved blade 66 as shown in FIG. 7. This blade has a groove 67 and is used with a ribbed roller 68 like roller 56 of FIG. 6 and a smooth roller 69 like those shown in FIG. 2. The blade with rolled groove cannot cut exactly straight unless more set is put in the teeth on the ridge side of the blade. This type of blade 66 is particularly suitable for cutting soft materials such as bread.

Figure 8:
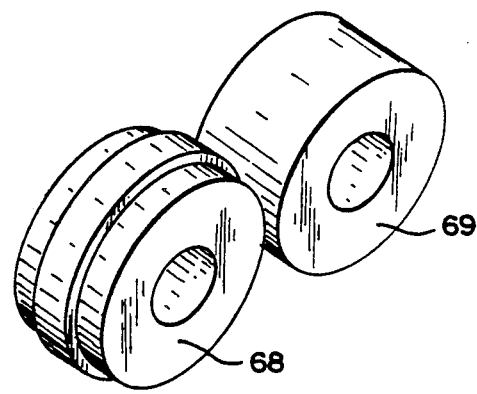
FIG. 8 is an isometric view of the rollers used with the bandsaw blade of FIG. 7.
Figure 9:
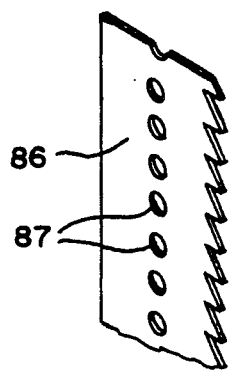
FIG. 9 is a perspective view of a portion of yet another bandsaw blade for use with my offset bandsaw.
Figure 10:
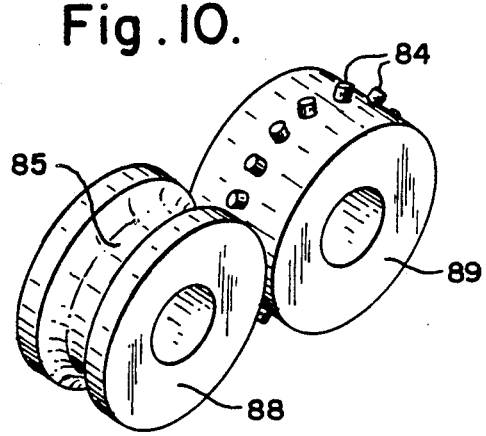
FIG. 10 is an isometric view of the rollers used with the bandsaw blade of FIG. 9.

Another type of blade 86 is shown in FIG. 8 which is used with the rollers of FIG. 9. In this arrangement, punched holes 87 are provided along the middle of bandsaw blade 86. One of the mated rollers 89 is provided with sprockets 84 positioned along its perimeter. The distance between each of holes 87 on bandsaw blade 86 is the same as the distance between each sprocket 84 on roller 89. The mating roller 88 is provided with a concave face 85 to interact with sprockets 84. By use of the sprocket 84 and holes 87, bandsaw blade 86 is maintained between roller pairs 88 and 89.

Although I have shown toothed blades in the drawings other types of blades can be used. Toothed, serrated or knife-edged blades can be used with rollers 88 and 89 without being dulled thereby. Moreover, blade 86 can be provided with a cutting edge or teeth on both sides to enable forward and backward cutting of the workpiece.

Use of rollers 28, 30, 128 and 130 eliminates the need of a roller bearing which is used in common bandsaw designs to prevent the blade from being forced off the pulleys. The absence of the roller bearing permits a more compact bandsaw unit. Moreover, such a design provides support to blade close to the kerf of the workpiece. Furthermore, perforated blade 86 provides an improved retention of lubricant for stationary power bandsaw models.

Figure 11:
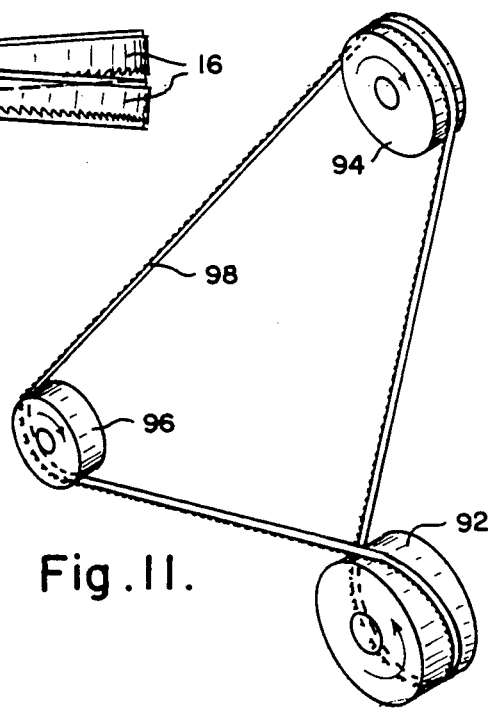
FIG. 11 is a isometric view of a second present preferred offset bandsaw according to my invention.

A second preferred embodiment of my offset bandsaw which utilizes three wheels is shown in FIG. 11. In this embodiment blade 98 passes over pulley 92, top pulley 94 and back pulley 96. Bandsaw blade 98 is provided with a 360° twist before welding. Top pulley 94 is offset from drive pulley 92 thereby providing a more natural path for bandsaw blade 98. Unlike the previous arrangement, only one cut is made by the bandsaw blade. However, this embodiment provides a compact design with the stresses on the bandsaw blade 98 minimized to the greatest extent possible. Moreover with this embodiment one can cut intricate shapes because only a single blade is used. Another advantage of this embodiment is that the throat capacity of the work table, that is the distance from the cutting blade to the arm carrying the oppositely moving portion of the blade, is significantly increased over prior art bandsaws without substantial increase in the overall weight of the machine.

Although I have described my bandsaw as being particularly useful for cutting large stock and have given dimensions of a present preferred embodiment it should be understood that my invention is not limited to any particular size. My bandsaw could be made as a compact portable unit. It could also be used in a bandsaw mill for sawing logs. The band may range in size from less than an inch in width to 6, 8, 10 inches or larger.

While I have shown and described present preferred embodiments of my invention, it is to be distinctly understood that the invention is not limited thereto but may be otherwise variously embodied and practiced within the scope of the following claims.

I claim:

1. An offset bandsaw comprising:
   (a) a first pulley secured on a first rotational axis, said first pulley adapted to receive a bandsaw blade;
   (b) drive means connected to said first pulley for rotating said first pulley about said first rotational axis;
   (c) a second pulley set apart from said first pulley, said second pulley having a second rotational axis offset from said first rotational axis, said second pulley adapted to receive a bandsaw blade; and
   (d) a bandsaw blade wrapped around said first pulley and said second pulley, said bandsaw blade formed from a belt welded to have a 360° twist therein, said bandsaw blade following a figure 8 path about said first pulley and said second pulley,
   wherein the offset position of said second pulley decreases the stress on the bandsaw blade.

2. The bandsaw of claim 1 wherein at least one of the first pulley and the second pulley can be moved to change the offset between the first rotational axis and the second rotational axis.

3. The bandsaw of claim 1 wherein two portions of said bandsaw blade travel in opposing directions between said first pulley and said second pulley, said bandsaw further comprising a front upper roller pair, a front lower roller pair, a back upper roller pair, and a back lower roller pair, each of said roller pairs positioned intermediate said first pulley and said second pulley, said front upper roller pair and said front lower roller pair sized and positioned to guide a first of said two portions of said bandsaw blade and said back upper roller pair and said back lower roller pair sized and positioned to guide a second of said two portions of said bandsaw blade, such that each said portion of said bandsaw blade cuts in the same kerf.

4. The bandsaw of claim 3 wherein said bandsaw blade is provided with a groove therein and one roller in each of said roller pairs is provided with a rib corresponding to said groove on said bandsaw blade.

5. The bandsaw of claim 4 wherein the other roller in each of said roller pairs is provided with a groove corresponding to said rib on said one roller.

6. The bandsaw of claim 3 wherein said bandsaw blade is provided with a plurality of spaced apart holes and one roller in each of said roller pairs is provided with a plurality of sprockets corresponding to said holes in said bandsaw blade and the other roller in each of said roller pairs is provided with a concave face.

7. The bandsaw of claim 1 wherein the two portions of said bandsaw blade travel in opposing directions between said first pulley and said second pulley, said two portions positioned along the same cutting line.

8. The bandsaw of claim 7 wherein said two portions of said bandsaw blade cut along the same kerf of a workpiece.

* * * * *

UNITED STATES PATENT AND TRADEMARK OFFICE
CERTIFICATE OF CORRECTION

PATENT NO. : 5,001,957
DATED : March 26, 1991
INVENTOR(S) : EDWARD T. STECKLER

It is certified that error appears in the above-identified patent and that said Letters Patent is hereby corrected as shown below:

Column 6, claim 7, line 28, delete "the".

Signed and Sealed this

Fourth Day of August, 1992

*Attest:*

DOUGLAS B. COMER

*Attesting Officer*      *Acting Commissioner of Patents and Trademarks*